United States Patent [19]

Kurek

[11] Patent Number: 5,476,596
[45] Date of Patent: Dec. 19, 1995

[54] OXIDATION AND HYDROLYSIS OF CYANIDES USING METAL CHELATES ON SUPPORTS OF METAL OXIDE SOLID SOLUTIONS

[75] Inventor: Paul R. Kurek, Barrington, Ill.

[73] Assignee: UOP, Des Plaines, Ill.

[21] Appl. No.: 262,110

[22] Filed: Jun. 17, 1994

[51] Int. Cl.$^6$ ............................... C02F 1/72; C02F 1/78
[52] U.S. Cl. ............................... 210/763; 210/904
[58] Field of Search ........................ 210/758, 762, 210/763, 904

[56] References Cited

U.S. PATENT DOCUMENTS

| | | | |
|---|---|---|---|
| 3,510,424 | 5/1970 | Zumbrunn | 210/759 |
| 3,715,309 | 2/1973 | Zumbrunn | 210/759 |
| 3,970,554 | 6/1976 | Fischer et al. | 210/759 |
| 4,290,913 | 9/1981 | Frame | 252/428 |
| 5,120,453 | 6/1992 | Frame et al. | 210/759 |
| 5,207,925 | 5/1993 | Steiner et al. | 210/763 |
| 5,232,887 | 8/1993 | Arena et al. | 502/163 |

*Primary Examiner*—Neil McCarthy
*Attorney, Agent, or Firm*—Thomas K. McBride; Eugene I. Snyder

[57] ABSTRACT

The oxidation of inorganic cyanides and the concurrent hydrolysis of many organic cyanides can be effected in aqueous media using a diversity of metal chelates supported on metal oxide solid solutions. Metal oxide solid solutions containing magnesium and aluminum oxide or magnesium, nickel and aluminum oxide are specially favored to effect oxidation-hydrolysis even at temperatures over 100° C.

18 Claims, No Drawings

OXIDATION AND HYDROLYSIS OF CYANIDES USING METAL CHELATES ON SUPPORTS OF METAL OXIDE SOLID SOLUTIONS

BACKGROUND OF THE INVENTION

It is only in relatively recent years that society has appreciated the impact and consequences of the fact that we live in a closed ecological system. With an increase in human population and, perhaps more importantly, an increase in industrial activity the effects of ecological changes have become more apparent. One area which has received a great deal of attention is that of water quality, which may be the result of the belated recognition that not only is water of a suitable quality for human consumption a limited resource, but that good water quality is an important, if not critical, factor in the ecological chain. Consequently attention has turned not only to purification of water in local water supplies, but also to limiting the discharge of materials into streams and aquifers generally.

The classes of noxious materials (pollutants) in aqueous discharges vary over an enormously broad spectrum. Among the inorganic pollutants those toxic to a broad spectrum of biological species are especially dangerous. Although heavy metals such as lead, cadmium, and arsenic often are the first culprits thought of, inorganic water soluble cyanide is in a comparably dangerous class because of the generally low tolerance of life forms to cyanide.

The sources of cyanide are many and varied and include iron and steel manufacturing, petroleum and coal pyrolysis processes, the photographic, chemicals, and pharmaceutical industries, precious metal mining and metal finishing, including electroplating and galvanizing. For example, cyanide arises in iron and steel manufacture by reduction of carbonate in the presence of carbon and nitrogen. In power plants coal burning may afford coke oven gas with a hydrogen cyanide concentration on the order of 2 grams per liter. Cyanide solutions are an important component of electroplating and galvanizing, and wash water streams resulting from post-coating treatment often contain significant quantities of cyanide. The widespread prevalence of cyanide in industrial effluents coupled with their near universal toxicity to life has made it imperative to minimize cyanide concentration in aqueous streams.

Although several methods for cyanide removal previously have been taught, we recently disclosed particularly efficient and cost-effective means for oxidizing inorganic cyanide to nitrogen and carbon dioxide using a class of metal chelates, most usually dispersed on a support. See U.S. Pat. Nos. 5,120,453 and 5,273,663. Such materials are effective for inorganic cyanide removal but they are ineffective at removing organic cyanide by means other than adsorption. In this application we disclose that when the support for the aforementioned metal chelate is one of the class of metal oxide solid solutions related to hydrotalcite, the resulting material is effective as a catalyst for both the oxidation of inorganic cyanides and the hydrolysis of organic cyanides. Not only does our material catalyze the hydrolysis of organic cyanides where the prior art catalyst fails, but our material also effects a more rapid oxidation of inorganic cyanide than does our own prior art catalyst. Both properties of the catalyst of our present invention are utterly unexpected from the teachings of the prior art.

SUMMARY OF THE INVENTION

The purpose of this invention is to provide a process for the removal of cyanides, both inorganic and organic, from aqueous waste streams and an improved catalyst therefore. An embodiment comprises oxidizing inorganic cyanides and hydrolyzing organic cyanides by contacting a cyanide-laden aqueous stream with an oxidizing agent in the presence of a class of metal chelates supported on metal oxide solid solutions. In a specific embodiment the chelate is a phthalocyanine of cobalt, vanadium, nickel, or iron. In a more specific embodiment the catalyst is a chelate of a sulfonated cobalt phthalocyanine dispersed on a metal oxide solid solution of magnesium, nickel, and aluminum oxides and the oxidizing agent is oxygen. Other embodiments will be apparent from the ensuing description.

DESCRIPTION OF THE INVENTION

The need to remove cyanide from various waste water streams has been elaborated upon above. Although various methods currently are available, there remains a need for a process which is at once sufficiently flexible to be applicable to varying concentrations of cyanide, to be capable of being adaptable to both continuous and batch processes, to be catalytic in nature, and to be capable of using oxygen as the oxidizing agent. Of overriding importance is the need for a process which is operable under a broad pH range. We have found that a class of metal chelates previously used in the oxidation of sulfides, especially mercaptans under basic conditions, are also effective in the oxidation of inorganic cyanides.

It needs to be explicitly understood and recognized that the permissible cyanide level remaining after treatment of the water stream is variable. For example, the proposed standards for drinking water sets a level of 0.2 ppm as the maximum permissible. If an electroplater of common metals discharges to a publicly owned treatment waterwork less than 38,000 liters per day, the 4-day average of cyanide amenable to treatment is not more than 2.7 ppm. For the same type facility discharging 38,000 liters or more per day, the 4-day average can not exceed 1.0 ppm of total cyanide. From the foregoing it should be clear that a variety of final cyanide levels will be found acceptable; no single standard may be stated.

Any aqueous stream containing inorganic and organic cyanides is suitable for use in this invention, which is to say that the nature of the cyanide is largely immaterial. Under acidic conditions the principal inorganic cyanide present is HCN. Hydrogen cyanide waste stream may result from HCN production and from acidification of streams containing cyanide salts of various types, e.g., sodium cyanide, potassium cyanide, and the alkali or alkaline earth metal cyanides generally. Hydrogen cyanide also may result from acidification of aqueous streams of tightly complexed metal cyanides. Under basic conditions inorganic cyanide will be present largely as alkali metal cyanides, in the case of "simple" cyanides, or as metal complexed cyanides for many of the heavier metals.

It is well known that cyanide complexes with many metals in several oxidation states to form a dazzling number and variety of metal cyanide complexes. Such metal complexes may be found in various compilations well known to and readily available to the practitioner, and therefore need not be elaborated upon here. Exemplary of such complexes are the well known iron complexes, such as hexacyanoferrate (II) and (III), gold complexes such as dicyanoaurate (I)

and tetracyanoaurate (III), silver complexes as dicyanoargentate (I), chromium complexes such as dicyanochromate (HI), nickel complexes such as hexacyanonickelate (II), copper complexes as tricyanocuprate (I) and tetracyanocuprate (II). It must be recognized that the foregoing are merely exemplary and representative, and many more complexes have been documented for cadmium, mercury, zinc, platinum, cobalt, molybdenum, manganese, vanadium and titanium, to mention but a few metals.

The advantages presented by the capability of our invention to oxidize inorganic cyanide under acidic conditions may be seen more clearly when comparing the present practice of cyanide removal from streams containing strongly complexed cyanide with the procedure our invention makes possible. Previously, aqueous streams containing complexed cyanides were treated with strong bases to precipitate a cyanide-containing sludge, the sludge was collected and then transported to a central site. To remove cyanide, the sludge was acidified and the generated HCN was trapped in a basic solution, and the basic cyanide then oxidized by, e.g., hypochlorite. In contrast, in the practice of our invention the aqueous stream containing complexed cyanide may be oxidized directly, especially where the stream does not contain particulates or sludge.

Our invention is applicable most desirably to streams containing up to about 2000 parts per million cyanide, although it is preferably applicable to streams containing no more than about 100 ppm cyanide. Many streams contain cyanide on the order of 5 ppm, and for these streams our invention is especially effective. However, it needs to be clearly understood that our invention may be applicable to streams containing as much as several percent cyanide, although such streams may be an uncommon occurrence. Cyanide-laden aqueous streams include waste streams from metal plating industries, from photography laboratories, steel mills, chemicals waste streams such as arise in HCN and, e.g., acrylonitrile manufacture, and streams from the mining industry. However, the nature of inorganic cyanide-containing streams which can be treated by the process of our invention is not particularly critical in any way since after acidification of inorganic cyanides, whether complexed or not, the principal cyanide remaining is hydrogen cyanide. Yet it also must be recognized that there is considerable diversity among the streams of their source. For example, waste streams from mining generally will contain predominantly complexed metal cyanides, whereas waste streams from a chemical plant practicing hydrocyanation probably will have only alkali metal cyanides originally.

The invention also is applicable to streams containing organic cyanides. It is not uncommon to generate organic cyanides (nitriles) in processes where HCN is a reagent in an organic chemical reaction. Where generated the organic cyanide also tends to accumulate in waste streams containing inorganic cyanide. For example, the organic cyanides which may be treated by the process which is our invention include acetonitrile, propionitrile, acrylonitrile, the cyanopyridines, cyanobenzene, cyanotoluene, chlorinated cyanoaromatics, methyl cyanohydrin, ethyl cyanohydrin, propyl cyanohydrin, aminoethyl nitrile, aminopropyl nitrile, and so forth. For these waste streams it is imperative to remove both inorganic and organic cyanides. Whereas inorganic cyanides are readily oxidized in several processes, including the process of this invention, organic cyanides are generally oxidation resistant. But what we have found is that the oxidation catalysts of this invention serve concurrently as hydrolytic catalysts for organic cyanides according to the equation:

Both the amide and carboxylic acid are less objectionable organic waste products than is the organic cyanide and can be readily removed by ion exchange resins, hence hydrolysis is highly desirable from a waste water cleanup perspective. The formation of ammonia generally is unobjectionable.

The key to our invention is our discovery that certain metal chelates when supported on metal oxide solid solutions are effective both in catalyzing the oxidation in air of inorganic cyanides and in catalyzing the hydrolysis of organic cyanides in an aqueous feed containing both types of cyanides. Such catalysts previously were taught to be effective in sweetening sour hydrocarbons; see U.S. Pat. No. 5,232,887. The metal chelates which act as catalysts are known to the art as effective in catalyzing the oxidation of mercaptans contained in a sour petroleum distillate to disulfides. The metal chelates include the metal compounds of tetrapyridinoporphyrazine described in U.S. Pat. No. 3,980,582, e.g., cobalt tetrapyridinoporphyrazine; porphyrin and metalloporphyrin catalysts as described in U.S. Pat. No. 2,966,453, e.g., vanadium tetraphenylporphin carboxylate; corrinoid catalysts as described in U.S. Pat. No. 3,252,892, e.g., manganese corrin sulfonate; chelate organometallic catalysts such as described in U.S. Pat. No. 2,918,426, e.g., the condensation product of an aminophenol and a metal of Group VIII; and the metal phthalocyanines as described in U.S. Pat. No. 4,290,913, etc. As stated in U.S. Pat. No. 4,290,913, metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine, and the like. The iron-group (Group VIII metals) phthalocyanines and vanadium phthalocyanines are particularly preferred, and among the iron-group phthalocyanines cobalt phthalocyanine is especially preferred. The ring substituted metal phthalocyanines are generally employed in preference to the unsubstituted metal phthalocyanine (see U.S. Pat. No. 4,290,913), with the sulfonated metal phthalocyanine being especially preferred, e.g., cobalt phthalocyanine monosulfate, cobalt phthalocyanine disulfonate, etc. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine. Among the metals particularly preferred for use as a chelate are included iron, copper, cobalt, manganese, and vanadium.

The degree of derivatization importantly affects the solubility of the metal chelates, such as the phthalocyanines, of this invention. Using the phthalocyanines as a specific example, monosulfonation affords a chelate which still is water insoluble (under 0.1 weight percent) and which quite suitably can be dispersed on a catalyst support or carrier for use in heterogeneous catalysis of cyanide in aqueous streams. On the other hand, polysulfonation up to 3-4 sulfonic acid residues per phthalocyanine affords a metal chelate which is water soluble and which therefore can not be dispersed on the solid supports of this invention.

For use in a packed bed, heterogeneous catalytic operation the metal phthalocyanine catalyst is adsorbed or impregnated on a MOSS as a solid support in any conventional or otherwise convenient manner. In general, the support or carrier material in the form of spheres, pills, pellets, granules or other particles of uniform or irregular shape and size is dipped, soaked, suspended or otherwise immersed in an aqueous or alcoholic solution and/or dispersion of the metal phthalocyanine catalyst, where the aqueous or alcoholic solution and/or dispersion may be sprayed onto, poured over, or otherwise contacted with the adsorbent support. In any case, the aqueous solution and/or dispersion is separated, and the resulting composite is allowed to dry under ambient temperature conditions, or dried at an elevated temperature in an oven or in a flow of hot gases, or in any other suitable manner. In general, up to about 25 weight percent metal phthalocyanine can be adsorbed on the solid support or carrier material and still form a stable catalytic composite. A lesser amount in the range from about 0.1 to about 10 weight percent generally forms a suitably active catalytic composite, although the activity advantage derived from metal phthalocyanine concentrations in excess of about 2–5 weight percent generally does not warrant the use of higher concentrations. The catalysts of this invention are taught in another context in U.S. Pat. No. 5,232,887.

The metal oxide solutions of this invention may be represented by the formula $$A_a C_c O_{(a+c)}(OH)_c$$

where A represents a divalent metal cation or a combination of divalent metal cations, and C represents a trivalent metal cation, or some combination of trivalent metal cations. Where there is only one divalent metal cation we will refer to the materials as binary metal oxide solid solutions, or binary MOSSs. The class of MOSSs where there are two divalent metals are referred to as ternary metal oxide solid solutions and may be represented by the formula $$A_a B_b C_c O_{(a+b+c)}(OH)_c$$

where A and B are divalent metal cations. Representing the formula of our metal oxide solid solutions in this way clearly points out their basic character. The divalent metal cations contained in the MOSSs used as supports in our invention are magnesium, nickel, calcium, barium, iron, copper, zinc, and cobalt. Among the trivalent metal cations may be mentioned those of aluminum, chromium, gallium, and iron, in any combination, along with the trivalent lanthanides in combination with aluminum or gallium. The lanthanide metals are those of atomic number from 57 through 71 with lanthanum and cerium being the most important members of this group.

The subscripts a, b, and c represent the relative number of gram atoms of the cations A, B, and C, respectively. For the metal oxide solid solutions of our invention (a+b)/c can vary between about 1 and about 10, with the range from about 1.5 up to about 5 of particular importance. That is, the relative number of gram atoms of the divalent metal(s) is from about 1 up to about 10 times that of the trivalent metal. This ratio is independent of the nature of A (or B when present). When B is absent (a binary MOSS) b=0; where one has a ternary MOSS b>0. In the ternary MOSSs the range of values of the ratio a/(a+b) does vary with the nature of the divalent metals since some characteristics of the resulting MOSS are sensitive to the relative amounts of the divalent metals. For example, where A=magnesium and B=nickel, it is found that the ternary MOSS is quite resistant to rehydration at a nickel content of about 50 atom percent of the total divalent metal present and higher, although the ternary MOSS having even 5 atom percent nickel relative to the total of magnesium and nickel is resistant to rehydration relative to the MOSS where magnesium is the sole divalent metal. Similar characteristics are exhibited by the MOSS where A is magnesium and B is cobalt. Where A is cobalt and B is nickel the MOSS is hydration-resistant over the entire range of cobalt content, although values of a/(a+b) from 0.05 to 0.95 (5–95 atom percent cobalt relative to the total of cobalt and nickel) are preferred. The combination of unusual basicity and hydration resistance for the Mg-containing MOSSs make the preferred range of a/(a+b) in ternary MOSSs from 5 to 50 atom percent where A=Mg and B=Ni and from 5–75 atom percent where A=Mg and B=Co. In the Mg/Ni/Al system the dramatic increase in basicity with the incorporation of small amounts of Mg make the range $0.05 \leq Mg/Mg+Ni \leq 0.25$ especially interesting, which is also the case for Mg/Co/Al. However, it needs to be stressed that all of the described MOSSs afford an operable catalyst system.

The preparation of our metal oxide solid solutions starts from layered double hydroxides of formula $$A_a B_b C_c (OH)_{(2a+2b+2c)} (Z^{n-})_{c/n} \cdot mH_2O$$

where $Z^{n-}$ is an anion, conveniently $CO_3^=$, and $mH_2O$ is water of hydration. These layered double hydroxides are prepared by mixing aqueous solutions of suitable salts of A, B, C preferably at a temperature between about 0° and 10° C. to afford a precursor gel. Suitable salts of the metals in question include nitrates, carbonates, and sulfates. Other salts also may be used, especially those which decompose on calcination, such as hydroxide and carboxylic acid salts. Addition is performed at a pH of from about 9 up to about 14 and when addition is complete the mixture is stirred at a temperature generally between about 50° and about 80° C. for times which are typically on the order of 1 to about 24 hours. The layered double hydroxides which form are then collected, washed well with water, and dried, often at a temperature of about 100° C.

The metal oxide solid solutions of this invention are then prepared by calcination of the layered double hydroxide at temperatures between about 400° and about 750° C. for a time from about 1 to about 16 hours. The unusual stability of the solid solutions of a divalent metal oxide and a trivalent metal oxide prepared according to the foregoing procedure is evidenced by the fact that spinel formation is not seen until calcination temperatures of about 800° C., whereas in the prior art the spinel phase begins to appear at a calcination temperature of about 600° C. In addition, the MOSSs of our invention show greater product homogeneity as evidenced by the resistance to spinel formation.

Although the process which is our invention can be designed to operate satisfactorily under ambient conditions of temperature and pressure, this is not to say that these are the only conditions under which the process can be suitably practiced, or even that these are preferable reaction conditions for the oxidation of cyanide by oxygen in the presence of the metal chelates of this invention. In fact, one of the strengths of our invention is that it can be utilized under a very wide range of conditions. Thus, as to reaction temperature, temperatures may be as low as about 20° C. and as high as about 250° C. If the reaction is conducted at 1 atmosphere pressure, one is limited to an upper temperature of about 95°

C. for aqueous systems because of the increased vapor pressure arising from water. On the other hand, if one is willing to operate at a higher pressure, or if other considerations make it desirable to operate at a higher pressure, then temperatures in excess of 95° C. may be used. It is certainly true that the higher the reaction temperature the faster the cyanide oxidation will proceed. Similarly, the higher the partial pressure of oxygen—assuming its use as the sole oxidant—the faster will the reaction proceed. Consequently there are some advantages to working at partial pressures of oxygen higher than 1 atm. and at as high a temperature as possible under the reaction pressures employed. As a practical matter, it is believed that temperatures in excess of about 250° C. and pressures in excess of about 40 atmospheres will prove only marginally beneficial and that no real economic benefit will accrue from practicing the invention herein under more stringent conditions.

It is also possible to practice our invention using either a flowing oxygen-containing gas stream or by presaturating the feedstream with oxygen and then oxidizing the saturated feedstream. In the first variant the reactants are in a two-phase system, and in the second variant the reactants are in a single-phase system. The variant where there is a flowing oxygen-containing gas stream presents the advantage that oxygen always can be present in great excess, although not in solution with the cyanide. Accordingly, some phase transport problems may arise. In the variant where all the oxygen is present in the feed stream oxygen transport is easier but the extent of cyanide oxidation, the rate of cyanide oxidation, or both, may be limited by the concentration of dissolved oxygen. Which variant is chosen is largely a matter of design choice.

As previously mentioned, the preferred oxidizing agent is oxygen, whether from air or from an oxygen-enriched gas. Other oxidants also may be used, in particular hydrogen peroxide and ozone, but these are not seen to be as generally convenient as that of oxygen. Where the cyanide content of the aqueous stream is no more than about 15 ppm, one can readily use air at atmospheric pressure as the source of oxygen, for under these conditions the level of dissolved oxygen will be sufficient for the concentration of cyanide present. On the other hand, one can go to higher pressures to effect higher concentrations of dissolved oxygen. However, we have found it more effective to continually bubble oxygen through the cyanide-laden aqueous stream in the reaction zone in order to provide sufficient oxygen for oxidation of cyanide at levels considerably higher than 15 ppm. Adequate dispersal of oxygen in the aqueous feedstock in contact with the metal chelate as catalyst is of considerable importance, but since appropriate methods of dispersal are well known in the art these will not be further discussed. Where a peroxide, such as hydrogen peroxide, is used as the oxidizing agent it can be conveniently added to the feedstock in an amount adequate to completely oxidize the cyanide present.

Although it is believed that temperature and oxidant concentration are the most important variables in the practice of our invention, other factors such as resident time, cyanide concentration, and specific nature of the cyanide constitute other process variables which the skilled worker will readily adapt to. The process variables can be changed over a rather broad range to affect the amount of cyanide oxidized. No inviolate rules can be stated for the degree of cyanide which should be removed; no standard is applicable to all feedstocks and discharges. One desirable characteristic of our process is that removal of 90% of the cyanide is routine, removal of 95% is not difficult, and removal of greater than 98% is well within process capabilities.

It is contemplated that the process of our invention will be most useful when practiced in a continuous mode using a packed bed of the metal chelate dispersed on a MOSS as a support. The cyanide-laden acidic feedstock can be passed either upflow or downflow, and the oxygen passed either concurrently or countercurrently. In yet another variation, suitable where the cyanide concentration is less than about 15 ppm, the feedstock can be saturated with oxygen prior to being contacted with the metal chelate in the reaction zone. As discussed previously, the level of oxygen dissolved in water is sufficient to oxidize up to about 15 parts per million cyanide, which accounts for the operability of the last described embodiment.

Even though the continuous oxidation of cyanide using a packed bed of a metal chelate dispersed on a metal oxide solid solution as a support may be practiced in any of the aforementioned modes, it has been found that a cocurrent oxygen feed may lead to oxygen-starved media and thereby may limit the amount of cyanide which can be oxidized under a given set of experimental conditions. Where this occurs one may operate a packed bed reactor in a trickle bed mode with countercurrent oxygen flow, that is, the aqueous feedstock flows downward over the packed catalyst bed and the oxygen is passed upward through the packed catalyst bed. It is anticipated that in this mode it is feasible to satisfactorily oxidize cyanide at concentrations at least as high as about 500 ppm when working at a pressure of air (as the sole oxygen source) of 1 atmosphere and a reaction temperature no more than about 95° C. It is expected that substantially higher cyanide concentrations can be used at higher partial pressures of oxygen and higher reaction temperatures or lower space velocities. Especially where higher partial pressures of oxygen (i.e., over about 0.2 atmospheres) are used, or where oxygen addition is staged, cocurrent oxygen flow may provide adequate oxygen and may be preferred for economic reasons.

Other embodiments and variants will be apparent to the skilled worker, all of which are intended to be encompassed within and subsumed by our invention as claimed. The following examples merely illustrate several aspects of this invention. The examples are not intended to be exhaustive nor to restrict our invention in any way, and in particular our invention is not to be thought of as being limited to the examples themselves.

EXAMPLES

The metal chelates supported on metal oxide solid solutions were prepared as described in U.S. Pat. No. 5,232,887. Metal oxide solutions were those available from Alcoa as Sorbplus™ and are largely magnesium oxide-aluminum oxide; see U.S. Pat. Nos. 5,068,095, 5,055,199, and RE 34,164, a reissue of U.S. Pat. No. 4,904,457.

Procedure. Feed was charged to a 2 liter reservoir equipped with a nitrogen blanketing system and polypropylene feed tube with filter. The feed was pumped through this tube and up to operating pressure by an HPLC pump. The exit lines from the pump were made of stainless steel and the feed was then sent to a heated reactor column (½" dia. HPLC column) containing the catalyst charge. The reactor zone was kept under constant air pressure of between 50 to 100 psig. The air rate was 35 to 70 cc/min and was controlled by a calibrated rotameter with a constant head pressure of air. The feed reacted within the heated catalytic zone at various weight hourly space velocities. The resulting reaction product was then cooled, inline, by a water bath, then depressurized to atmospheric pressure and collected in a sample bottle after passing through a back pressure regulator. This regulator kept the system at constant pressure. The product was periodically sent for pH cyanide, cyanate, ammonium and metals analysis.

Catalyst. For run 1 the catalyst contained 490 ppm cobalt on Sorbplus. Catalyst was prepared by rotary impregnation of 0.89 g cobalt phthalocyanine (mixed mono, di, tri and non sulfonated cobalt phthalocyanies) on 100 g Sorbplus. 25 ml or 20 grams of catalyst was used in the microreactor reactor with 35–70 cc/min air addition.

Feedstock was an aqueous solution containing 300 ppm cyanide as potassium cyanide and 2580 ppm 4-cyanopyridine. Weight hourly space velocity (WHSV) is expressed as grams feed per gram catalyst per hour.

Results are summarized in Table 1. The results clearly show cyanide conversion was 99% at 1 whsv, 100 at 0.5 whsv, With no cyanate formation. Organic cyanide conversion remained at 100% at WHSV less than 1.

TABLE 1

RUN 1

| | | | % Conversion | |
|---|---|---|---|---|
| Time (hrs) | WHSV (/hr) | Temp (°C.) | Inorganic Cyanide | Organic Cyanide |
| 8 | 0.5 | 75 | 100 | 100 |
| 16 | 0.5 | 75 | 100 | 100 |
| 24 | 0.5 | 75 | 100 | 100 |
| 32 | 0.5 | 75 | 100 | 100 |
| 40 | 0.5 | 75 | 100 | 100 |
| 48 | 0.5 | 75 | 100 | 100 |
| 56 | 0.5 | 75 | 100 | 100 |
| 64 | 0.5 | 75 | 100 | 100 |
| 72 | 0.5 | 75 | 100 | 100 |
| 80 | 0.5 | 74 | 100 | 100 |
| 88 | 0.5 | 74 | 100 | 100 |
| 96 | 0.5 | 75 | 100 | 100 |
| 104 | 0.5 | 74 | 100 | 100 |
| 112 | 0.5 | 74 | 100 | 100 |
| 120 | 0.9 | 72 | 100 | 100 |
| 128 | 0.9 | 72 | 100 | 100 |
| 136 | 0.9 | 75 | 100 | 100 |
| 144 | 0.9 | 75 | 99 | 83 |
| 152 | 2 | 67 | 97 | 81 |
| 160 | 2 | 73 | 92 | 56 |
| 168 | 2 | 74 | 74 | 48 |
| 176 | 2 | 79 | 81 | 63 |
| 184 | 2 | 81 | 72 | 56 |
| 192 | 2 | 85 | 62 | 56 |
| 200 | 2 | 89 | 66 | 62 |
| 208 | 0.5 | 73 | 77 | 83 |
| 216 | 0.5 | 77 | 75 | 100 |

In run 2 the procedure was similar to that above using an aqueous feedstock containing 330 ppm cyanide as KCN and 2580 ppm 4-cyanopyridine at pH 8. The catalyst contained 111 ppm Co and was prepared by a method analogous to that described above. Results are summarized in Table 2. Conversions of inorganic cyanide of at least 88% was observed at WHSV=0.5 and 1 with no cyanate detected. This is particularly significant in view of the fact that cyanate hydrolysis is very slow under these conditions, which implies that if cyanate had formed it would have persisted and been detected. Conversion of 4-cyanopyridine was complete at all conditions tested.

TABLE 2

RUN 2

| | | | % Conversion | |
|---|---|---|---|---|
| Time (hrs) | WHSV (/hr) | Temp (°C.) | Inorganic Cyanide | Organic Cyanide |
| 8 | 0.5 | 74 | 100 | 100 |
| 16 | 0.5 | 74 | 100 | 100 |
| 24 | 0.5 | 74 | 100 | 100 |
| 32 | 0.5 | 74 | 100 | 100 |
| 40 | 0.5 | 74 | 100 | 100 |
| 48 | 0.5 | 74 | 100 | 100 |
| 56 | 0.5 | 74 | 100 | 100 |
| 64 | 0.5 | 75 | 100 | 100 |
| 72 | 0.5 | 75 | 100 | 100 |
| 80 | 0.5 | 76 | 100 | 100 |
| 88 | 0.5 | 75 | 100 | 100 |
| 96 | 0.5 | 75 | 100 | 100 |
| 104 | 0.5 | 75 | 100 | 100 |
| 112 | 0.5 | 76 | 100 | 100 |
| 120 | 0.5 | 76 | 100 | 100 |
| 128 | 0.5 | 75 | 100 | 100 |
| 136 | 0.9 | 75 | 99 | 100 |
| 144 | 0.9 | 75 | 98 | 100 |
| 152 | 0.9 | 73 | 98 | 100 |
| 160 | 0.9 | 75 | 98 | 100 |
| 168 | 2 | 74 | 85 | 100 |
| 176 | 2 | 75 | 86 | 100 |
| 184 | 2 | 72 | 83 | 100 |
| 192 | 2 | 74 | 73 | 100 |
| 200 | 0.5 | 77 | 70 | 100 |
| 208 | 0.5 | 77 | 83 | 100 |
| 216 | 0.5 | 77 | 87 | 100 |

Comparative Example. The relative rates at 75° C. of a conventional, carbon-supported cobalt phthalocyanine catalyst and the MOSS supported cobalt phthalocyanine (described above) for oxidation of inorganic cyanide was determined using a microreactor. For carbon-supported catalyst (150 ppm Co) the feedstock contained 300 ppm cyanide as KCN at pH=11 and for the MOSS catalyst (111 ppm Co) the feedstock contained in addition 2580 ppm of 4-cyanopyridine. For the carbon-supported catalyst, 100% cyanide conversion required LHSV of 0.05; for the MOSS catalyst 100% conversion was observed at an LHSV of 1.0. Therefore, the catalysts of this invention oxidized cyanide about 20 times faster than the prior art catalyst.

What is claimed is:

1. A method of reducing the cyanide concentration in an aqueous stream comprising oxidizing inorganic cyanides with an oxidizing agent selected from the group consisting of oxygen, ozone, and hydrogen peroxide, and concurrently hydrolyzing organic cyanides under reaction conditions in the presence of a catalytically effective amount of a metal chelate supported on a metal oxide solid solution, where said metal chelate is selected from the group consisting of metal compounds of tetrapyridinoporphyrazine, porphyrin, corrinoid materials, and the phthalocyanines, and said metal oxide solid solution has the general formula $A_aC_cO_{(a+c)}(OH)_c$, where A is a divalent metal selected from the group consisting of magnesium, nickel, calcium, barium, iron, copper, zinc, cobalt, or any combination thereof, C is a trivalent metal selected from the group consisting of aluminum, chromium, gallium, iron, the trivalent lanthanides, and combinations thereof, and a/c has a value from 1 to about 10.

2. The method of claim 1 where the metal in the metal chelate is selected from the group consisting of iron, manganese, copper, cobalt, and vanadium.

3. The method of claim 2 where the metal chelate is a cobalt chelate.

4. The method of claim 1 where the metal chelate is a sulfonated cobalt phthalocyanine.

5. The method of claim 1 where reaction conditions include a temperature from about 20° C. up to about 250° C. and a total pressure from about 1 atmosphere up to about 40 atmospheres.

6. The method of claim 1 where the cyanide concentration is reduced by at least 90 percent.

7. The method of claim 6 where the cyanide concentration is reduced by at least 95 percent.

8. The method of claim 7 where the cyanide concentration is reduced by at least 98 percent.

9. A method of reducing the cyanide concentration in a cyanide-containing aqueous stream by oxidizing inorganic cyanides with oxygen and concurrently hydrolyzing organic cyanides comprising flowing at reaction conditions the cyanide-containing aqueous stream through a bed of a catalytic composite, said composite comprising a metal chelate supported on a metal oxide solid solution, where said metal chelate is selected from the group consisting of metal compounds of tetrapyridinoporphyrazine, porphyrin, corrinoid materials, and the phthalocyanines, and said metal oxide solid solution has the general formula $A_a C_c O_{(a+c)}(OH)_c$, where A is a divalent metal selected from the group consisting of magnesium, nickel, calcium, barium, iron, copper, zinc, cobalt, or any combination thereof, C is a trivalent metal selected from the group consisting of aluminum, chromium, gallium, iron, the trivalent lanthanides, and combinations thereof, and a/c has a value from 1 to about 10.

10. The method of claim 9 where the metal in the metal chelate is selected from the group consisting of iron, manganese, copper, cobalt, and vanadium.

11. The method of claim 10 where the metal chelate is a cobalt chelate.

12. The method of claim 9 where the metal chelate is a sulfonated cobalt phthalocyanine.

13. The method of claim 9 where reaction conditions include a temperature from about 20° C. up to about 250° C. and a total pressure from about 1 atmosphere up to about 40 atmospheres.

14. The method of claim 9 where the cyanide concentration is reduced by at least 90 percent.

15. The method of claim 14 where the cyanide concentration is reduced by at least 95 percent.

16. The method of claim 15 where the cyanide concentration is reduced by at least 98 percent.

17. The method of claim 9 where oxygen-containing gas flows countercurrent to the aqueous stream.

18. The method of claim 9 where oxygen-containing gas flows cocurrent with the aqueous stream.

* * * * *